United States Patent
Halter (10) Patent No.: US 7,579,580 B2
(45) Date of Patent: Aug. 25, 2009

(54) OPTICAL SENSOR AND METHOD FOR SUPPRESSING FAULTS BY DIFFUSED LIGHT

(75) Inventor: Peter Halter, Frauenfeld (CH)

(73) Assignee: Baumer Electric AG, Frauenfeld (CH)

( * ) Notice: Subject to any disclaimer, the term of this patent is extended or adjusted under 35 U.S.C. 154(b) by 198 days.

(21) Appl. No.: 11/394,550

(22) Filed: Mar. 31, 2006

(65) Prior Publication Data

US 2006/0219876 A1    Oct. 5, 2006

(30) Foreign Application Priority Data

Apr. 1, 2005    (CH)    .................................... 0606/05

(51) Int. Cl.
*H01J 40/14* (2006.01)
*G01N 21/86* (2006.01)
(52) U.S. Cl. ................. 250/222.1; 250/559.36
(58) Field of Classification Search ........... 250/221, 250/222.1, 559.29, 559.36
See application file for complete search history.

(56) References Cited

U.S. PATENT DOCUMENTS

| | | | | |
|---|---|---|---|---|
| 5,225,689 A | * | 7/1993 | Buckle et al. ............ | 250/559.4 |
| 5,321,255 A | * | 6/1994 | Kakinami et al. ........ | 250/222.1 |
| 5,466,945 A | * | 11/1995 | Brickell et al. .......... | 250/559.12 |
| 6,130,754 A | * | 10/2000 | Greene ...................... | 356/445 |
| 2003/0201386 A1 | | 10/2003 | Kato et al. ................. | 250/239 |

FOREIGN PATENT DOCUMENTS

DE    101 59 932    6/2003

* cited by examiner

*Primary Examiner*—Thanh X Luu
(74) *Attorney, Agent, or Firm*—Volpe and Koenig, P.C.

(57) ABSTRACT

An optical sensor (1) with a light beam (7) created by a pulsed primary light source (5), which light beam is reflected at a surface (13) of an object and is recognized by a detector. In order to mask interfering effects, which might develop due to diffused light of the light beam (7), a compensation light source (25) emits a light cone during station breaks in operation of the primary light source (5), which includes the diffused light range of the light beam (7) of the primary light source (5). In this way, objects within the diffused light area create a compensation light portion, which prevents the activation of the sensor output merely by the diffused light of the light beam (7).

22 Claims, 6 Drawing Sheets

OPTICAL SENSOR AND METHOD FOR SUPPRESSING FAULTS BY DIFFUSED LIGHT

BACKGROUND

The invention is directed to an optical sensor and a method as well as their use in a machine for suppressing faults due to diffused light in optical sensors.

Optical sensors for detecting objects can be embodied, for example, as reflection light sensors or light bars. They comprise a light source for sending visible or invisible light and a detector for receiving light, which is emitted by the light source. light emitting diodes, laser diodes, or IR-diodes can be used as light sources, for example. Depending on the embodiment of the sensor, the light source may be continuous or, in order to minimize external light influences, operated in a pulsed or clocked fashion. It is also known to polarize the light and/or to focus it via blind or lenses to a light beam.

For example, phototransistors or photodiodes can be used as detectors. Depending on the purpose and operation of the sensors, the light source and the detectors may be arranged in a common housing or spatially separated from one another in separate housings.

In conventional reflection light sensors, the light source emits a light beam, which is reflected by an object and/or a measuring object in a mirror-like or diffuse manner. Here, the light is reflected exactly in one direction or is reflected into the room, with a homogenous or irregular distribution of the light intensity. A portion of the reflected light can be recognized by the detector and evaluated. In other words, the light spot created by the light beam on the object is imaged on the light-sensitive surface of the detector by an imaging optic arranged in front of the detector.

Simple reflection light sensors only evaluate the intensity of the detected light: the shorter the distance between the light source and the measuring object the higher the light intensity recognized by the detector. By determining a switching threshold a switching distance can be predetermined for a certain type of object measuring. The switching distance adjusted in this manner can be influenced in an undesired manner by various parameters, such as e.g., color and reflection features of the object and the background or contamination of the sensor.

Most conventional reflection light sensors with background masking as well as distance sensors operate according to the triangulation principle. Here, the light portion reflected by the object in the direction of the detector is imaged on the detector and evaluated depending on the position and/or location of the recognized light on the detector, which is changing by the distance between the sensor and the object. The detector is embodied such that it can distinguish at least two different impingement positions of the light reflected at a measuring object. For example, two or more photodiodes or phototransistors can be used, discretely positioned or integrated on a common substrate.

The diameter of the beam of the light emitted by the light source, either coherent or incoherent, can be limited by optical elements, such as blinds or lenses. Based on the reflection and/or diffusion effects and/or reflexes at or in the transmitting elements the edge of the light beam cannot be limited precisely and the light intensity outside the core beam is not negligibly small. Primarily in highly sensitive detectors this can lead to the situation that even the light of the edge zones surrounding the core beam is sufficient to activate an output level of the sensor. In the following, the light in the edge zone of the light beam is called corona or diffused light or diffraction light, independent if the light was created by diffraction and/or diffusion and/or reflections (secondary spots) of the light emitted by the light source. If the detector is provided, e.g., in the form of a CCD-array in the form of a matrix with high spatial resolution, the differences in luminescence on the individual pixels can be evaluated and the exact position of the core beam can be determined. In a linear CCD-array, this can be performed within the array; however, not laterally to the linear array. If the detector includes only one or only few photo elements, the position of the light spot imaged on the detector and/or, in reflecting objects, of the core beam reflected at the object cannot be determined or distinguished from the corona in this manner. Problems can particularly arise when the light beam is not entirely reflected by an object, e.g., when the light at the edge zone of the beam already impinges the object at an object edge and is at least partially reflected towards the detector, but the light of the core beam is not.

SUMMARY

The object of the present invention is to provide an optical sensor for detecting objects and a method for suppressing faults by diffused light during the recognition of objects.

This object is attained by an optical sensor and by a method for suppressing faults by diffused light as well as their use in a machine according to the features of the invention.

In one aspect, the invention provides an optical sensor for detecting objects within a detection range using a light beam that can be created by a primary light source and a detector. The light beam has a diffused light corona encircling a core beam. The sensor includes a compensation light source for masking the interferences caused by the diffused light corona.

According to another aspect of the invention, the primary light source and the compensation light source can be operated in a pulsing manner, and the switching-on phases of the compensation light source occur during the switching-off phases of the primary light source.

The invention finds particularly advantageous use in machines for laterally detecting stacked objects.

BRIEF DESCRIPTION OF THE DRAWINGS

In the following, the invention is explained in greater detail using the figures, wherein.

DETAILED DESCRIPTION OF THE PREFERRED EMBODIMENTS

Figure 1:
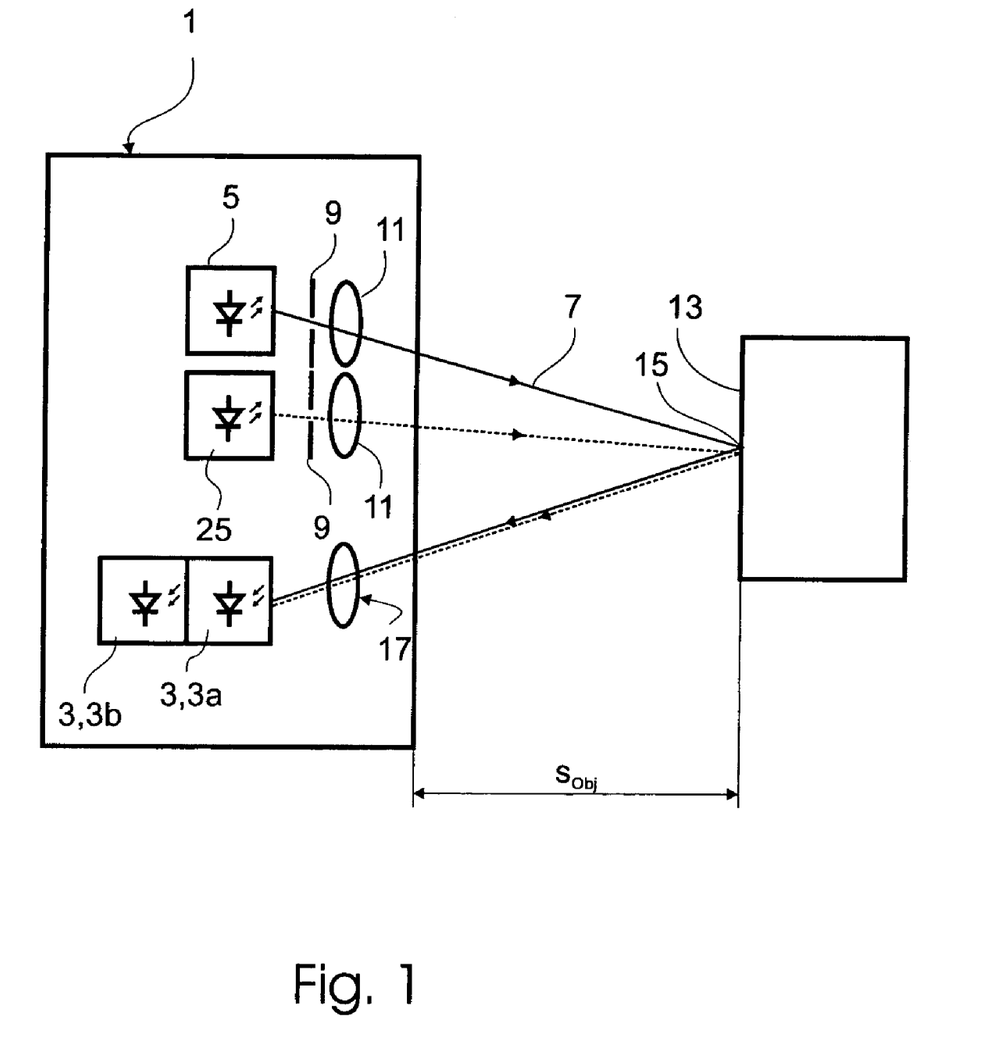
FIG. 1 is a view of a reflection light sensor with a primary light source and a compensating light source.
Figure 2:
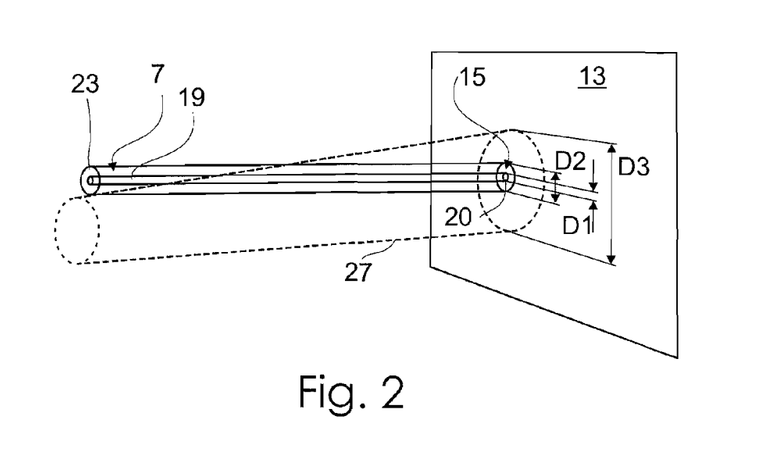
FIG. 2 is a representation of the light distribution of the primary and the compensating light source in the area of an object to be detected.
Figure 4:
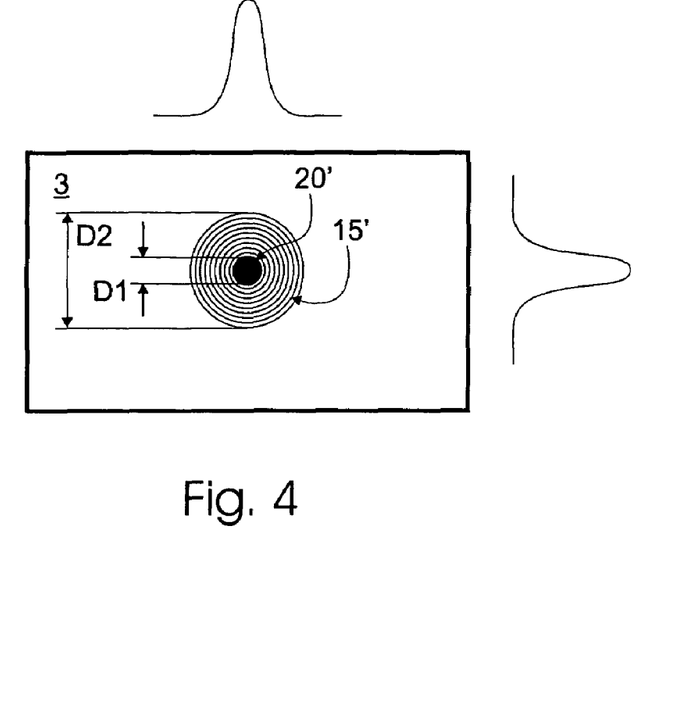
FIG. 4 is a representation of a first luminescence distribution onto a photodiode.
Figure 6:
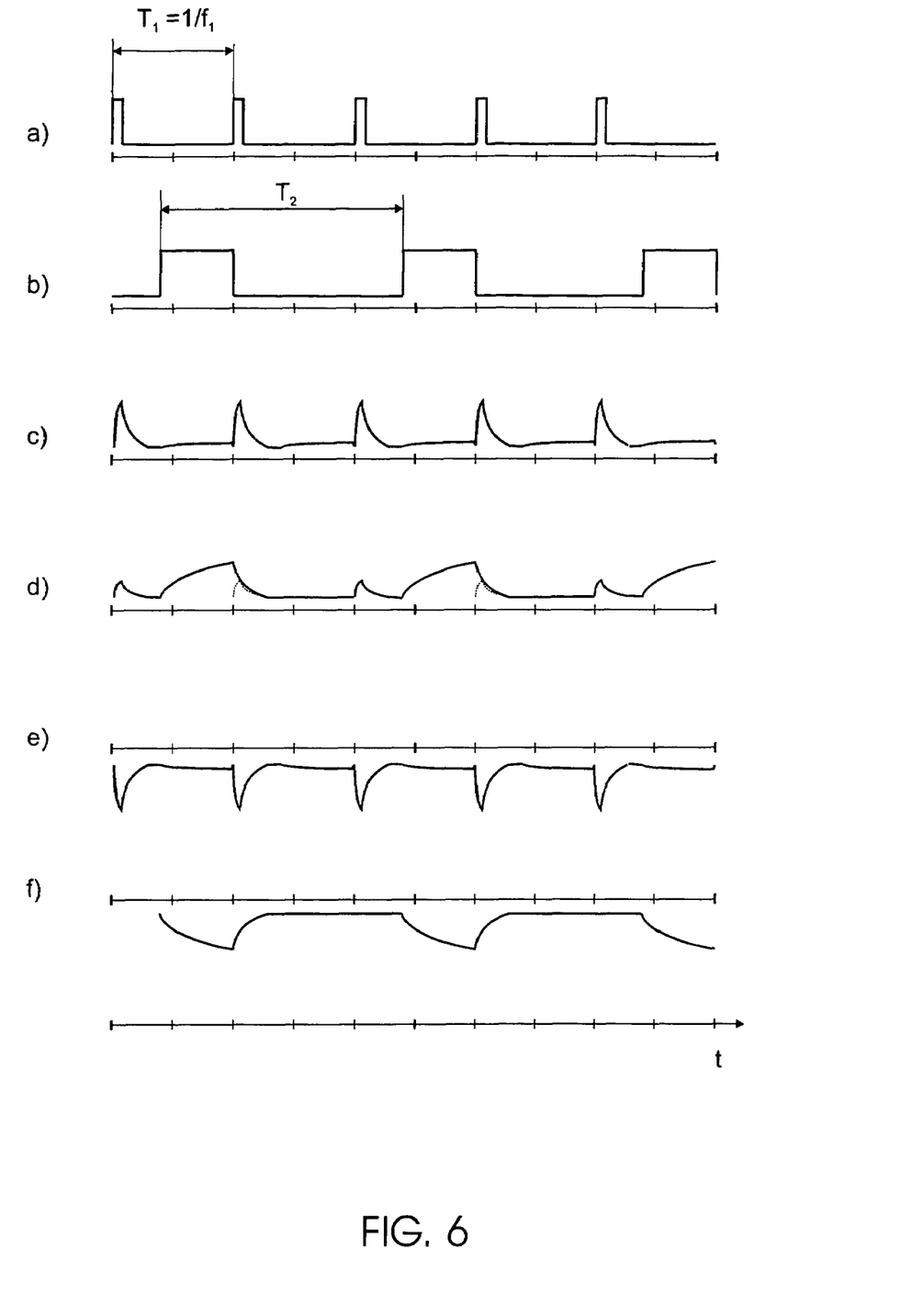
FIG. 6 is a diagram with the temporal signal progressions of a first exemplary embodiment of the sensor.

FIG. 1 shows schematically a reflection light sensor, in the following called sensor 1 for short. The term sensor 1 comprises optical proximity switches as well as distance sensors and light bars, in which a light beam is created, influenced by an object to be detected or measured, and recognized by a detector. The sensor 1 comprises two photodiodes 3, the first of which operates as a foreground diode 3a and the other one as a background diode 3b. Instead of photodiodes 3, other integrated, laminar photo elements can also be used, such as e.g. phototransistors, other position sensitive elements such as PSDs, or one-celled photodiodes or CCD-arrays. A primary light source 5 of the sensor 1, preferably a semiconductor laser or alternatively a light emitting diode, creates a light beam 7, with usually a blind 9 and an optical lens 11 being provided for limiting the core beam diameter D1 (FIG. 2). The core beam diameter D1 has approximately a distance of 150 mm from the primary light source 5, typically a value in the range from approximately 0.05 mm to approximately 5 mm, depending on light source. In a slightly different embodiment, the core beam has a line shape with a line length ranging from 3 to 30 mm and a line width of 0.05 to 5 mm depending on the version and distance from the sensor. This serves to compensate irregularities on an object to be detected and to compensate for object bulges in strongly reflective objects. The primary light source 5 is switched on and off by a constant or variable clock frequency f1 (FIG. 6). The clock frequency f1 can be set at a value e.g., 8 kHz. However, it may also be lower or considerably higher and ranged from approximately 100 Hz to approximately 1 MHz. For example, if the light pulses impinge surface 13 of an object, within an, in general, mechanically or electronically adjustable and changeable detection range (distance from the sensor, within which objects can be detected by the sensor), the light spot 15 created thereby on the surface 13 is dispersed and/or reflected in a mirror-like manner and, via another imaging optic 17, depending on the distance from the object, imaged on one or both of the photodiodes 3 or at a photodiode array, depending on the distance, on different areas of said array. The light spot 15 has a diameter D2 (FIG. 2) measuring 3 mm, e.g. If the distance of the object in reference to the sensor 1 is changed, the position of the light spot 15' imaged on the detector by the photodiodes 3 changes too, according to the principle of triangulation. The dimensions of the light-sensitive photodiode surfaces is selected such that at a distance $S_{Obj}$, located inside of a generally pre-determinable detection range, at least the core beam 19 and/or the image 20' (FIG. 4) of the core beam 19 of the core-beam light spot 20 formed on the object surface 13 entirely impinges the light-sensitive detector surface. At different distances, the image of the light spot 15' impinges the detector only partially or not at all.

For distance sensors or reflection light sensors with background masking, typically two adjacent photodiodes 3a, 3b are used. They are arranged and aligned such that the light spot 15' imaged on the detector primarily impinges the foreground diode 3a, when the object surface 13 is located within a pre-determinable switching distance. When the object surface 13 is outside said switching distance, yet still within the detectable measuring range of the sensor 1, the light spot 15' primarily impinges the background diode 3b.

At each of the two photodiodes 3a, 3b, at first the alternating signal portion of the respective photocurrent is separated, amplified, the two components are subtracted from one another and/or added (depending on the algebraic sign of the photocurrent), if necessary, divided by a portion or the sum of the two and integrated during the predetermined temporal interval. The resulting value represents in a non-linear way the impinging point of the light spot 15' in reference to the foreground/background and thus the existence of an object in the foreground and/or in the background.

Figure 8A:
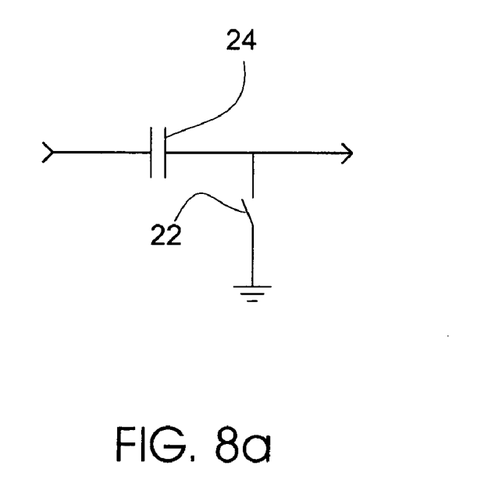
FIG. 8a is a view of a first switch arrangement for processing the detector signals.
Figure 8B:
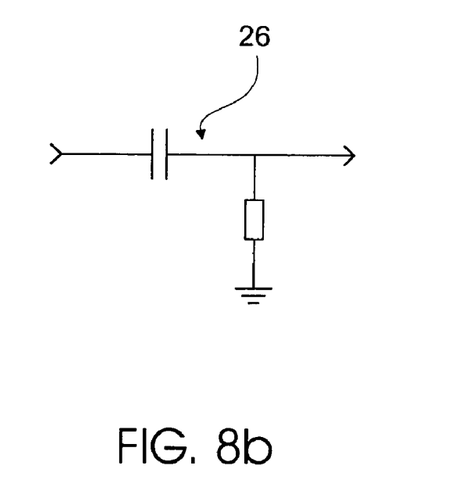
FIG. 8b is a view of a second switch arrangement for processing the detector signals.
Figure 8C:
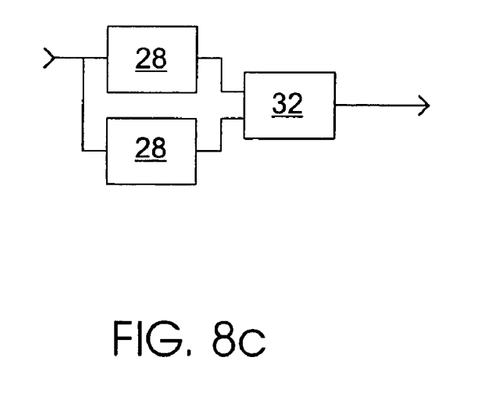
FIG. 8c is a view of a third switch arrangement for processing the detector signals.
Figure 8D:
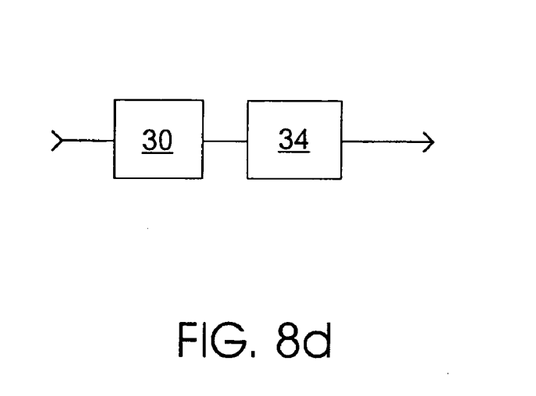
FIG. 8d is a view of a fourth switch arrangement for processing the detector signals.

The alternating signal extraction and evaluation of the photocurrent can occur in different ways. For example, within an integrated switch, which preferably uses electronic switches 22, shortly before transmitting a light pulse, the coupling condensers 24 are zeroed and/or discharged and, at the beginning of a pulse, opened again (FIG. 8a). This way, after the coupling condenser 24, the extracted alternating portion is charged at the end of a light pulse. If no electronic switches 22 are used, alternatively a high-pass filter 26 can be used for extracting the alternating signal (FIG. 8b). Here, only a single measuring occurs shortly before the end of a light pulse. Then, the linear average of the entry signal serves as the reference value, which behind the high-pass filter is equal to zero, as commonly known. The signal behind the high-pass filter 26 is therefore the difference between the transient value and the average value of the alternating portion. Other alternatives are the use of Sample & Hold 28 or AD-converter-member 30, in which, in the case of "Sample & Hold" 28, the entry signal is read prior to the pulse and at the end of the pulse and is subsequently subtracted by way of the difference determining element 32 (FIG. 8c). In the case "AD-converter" 30 the entry signal is first periodically read and digitized. The same method as selected for the analog signal processing can be used for the processing of digitized signals in a digitized processing unit 34 (FIG. 8d). In all cases mentioned, the extracted alternating portion can now be amplified and/or integrated and subsequently evaluated, e.g. in a single threshold circuit. The signal can also be digitized, for example via an AD-converter, and subsequently processed mathematically, for example, or connected via logical regulations and evaluated.

Figure 2A:
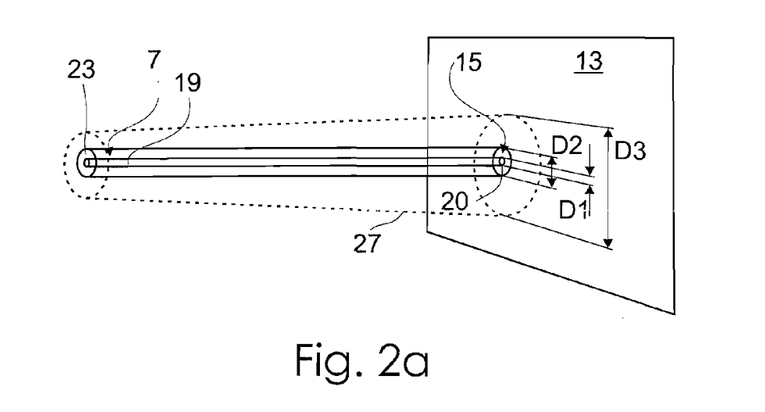
FIG. 2a is a view similar to FIG. 2 in which the compensation light source is positioned coaxially around the core beam.
Figure 3:
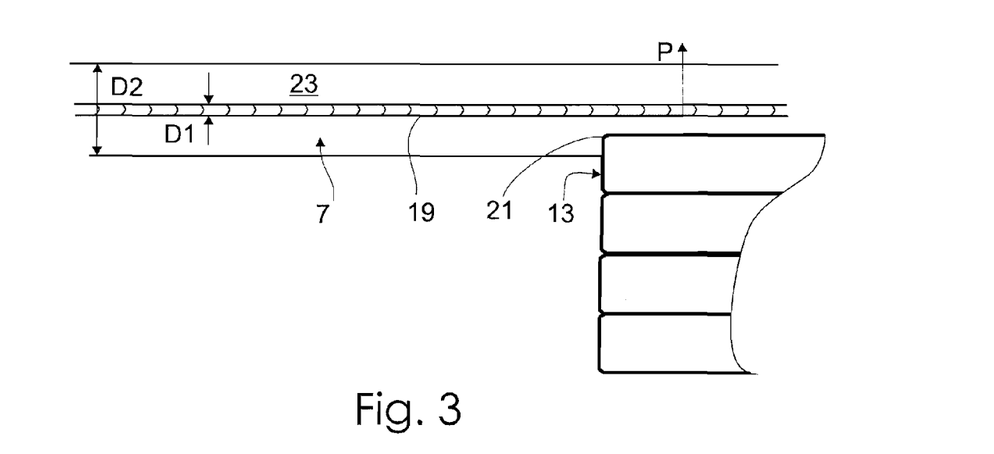
FIG. 3 is a representation of the entry of an object edge into the diffraction corona of the primary light source.

If an edge 21 of an object to be detected, such as a knife's edge, a stack of CDs or a wafer, enters laterally into the diffused light corona 23 of the laser beam or LED beam 7 in the detection area (arrow direction P), as visualized in FIG. 3, the diffused light portion impinging one of the light emitting diodes 3a, 3b of the detector could already lead to falsify the measurement and thus exceed a comparative value to be determined and could falsely open the output of the sensor 1. The sensor 1 would switch on too early during the transfer of an object through the beam 7 and at least switch off too late. If the object 13 is positioned slightly outside the adjusted switching distance, based on the diameter D2 of the diffused light corona 23 being too large in reference to the diameter D1 of the core beam 19, the entry of the object edge 21 into the diffused light corona 23 could lead to a falsification of the average position of the imaged measuring spot 15' on the photodiodes 3a, 3b, and thus of the evaluated distance value as well. Thus would cause a false activation of the sensor output level. In order to avoid this, a compensation light source 25 (FIG. 1) is provided according to the invention, which is positioned near the primary light source 5 and/or approximately in a level defined by the light beam 7 of the primary light source 5 and by the photodiode 3 and/or the photodiodes 3a, 3b. The compensation light source 25 is arranged and aligned such that it can emit a light beam of a light cone, which as completely as possible covers the diffused light corona 23 of the primary light source 5. For example, the compensation light source 25 can comprise a light emitting diode with an opening angle ranging from approximately 6° to 30°. Preferably, the opening angle is smaller than approximately 15 through 20°, so that a relative reduction of the radiation intensity of the compensation light source 25 in reference to the one of the primary light source 5 is as small as possible at an increasing distance from the light sources 5, 25. At a distance from the sensor 1 of approximately 150 mm the light spot of the compensation light source 25 can have a diameter D3 ranging from approximately 10 mm to approximately 50 mm, for example. Of course, additional optical elements such as blinds 9, lenses 11, dispersing disks (not shown), and the like can be provided in order to influence the dispersing of the light of the compensation light source 25. In a special embodiment, for example, a beam splitting prism (not shown) can align the light of the compensation light source 25 coaxially in reference to the light beam 7 of the primary light source 5. The latter is particularly advantageous when such a compensation light source 25 is used in a reflection light bar. In such a case, usually one photodiode 3a only is used for evaluating the imaged measuring spot 15'. Due to the fact that a recognition of the object in reflection light bars occurs over great distances, it is advantageous if the light cone 27 of the compensation light source 25 is coaxial (as shown in FIG. 2a) or almost coaxial (as shown in FIG. 2) in reference to the core beam 19 of the primary light source 5.

Due to the fact that this compensation light interferes with the light of the primary light source 5, during the evaluation of the difference of the two light components the sensitivity of sensor 1 is slightly reduced in reference to the primary light. The compensation light can be selected sufficiently weak in order for the reduction of the sensitivity to have little effect. However, when only the corona (without the core beam) of the light of the primary light source 5 and the compensation light impinge the object, the compensation light entirely compensates the light of the corona. A great advantage of this solution is the fact that in weakly reflective objects both the primary as well as the compensation light is weakly reflected. Here it shows that the reduction in sensitivity is minimal, in particular for objects requiring a high sensitivity of the sensor 1. However, highly reflective objects, with their reflection being strong enough for already reflecting the relatively weak light of the corona (without the core beam) are already sufficient to cause the output level of the sensor 1 to activate, i.e. they also reflect the compensation light strongly. This effectively prevents the faulty activation of the output level of the sensor 1.

The compensation light source 25 is addressed such that between the time shortly before transmitting and shortly before the end of the light pulse in the above-described alternating signal exclusion, a signal is created in a direction opposite to the one of the primary light source 5. Here, primarily the same evaluation unit can be used as in situations without a compensation light source 25. This can be achieved, on the one hand, by activating the compensation light source 25 during the station break of the primary light source 5 and by switching it off immediately prior to the beginning of the respectively subsequent light pulse of the primary light source 5. In the case of the alternating light exclusion by way of the high-pass described, the compensation method described operates such that the linear average value of the overall signal being shifted by the compensation signal and thus the reference point of the measurement is shifted as well. In additional embodiments the compensation signals can also be created such that they are temporarily created and evaluated entirely separate from the ones of the primary light source 5, and that they influence the measurement results only very little or not at all. In this case, the compensation occurs not immediately in the alternating light exclusion step but only thereafter by the two temporarily off-set measurement values of the signals of the primary light source 5 and/or the ones of the compensation light source 25 being subtracted from one another. For this purpose, values averaged over several periods can be used as well. It is beneficial to subtract only if the signal created by the compensation light source 25 is provided with a positive value. This is the case when the light primarily impinges the foreground diode. In the other case, only the light of the primary light source 5 is included.

Figure 5:
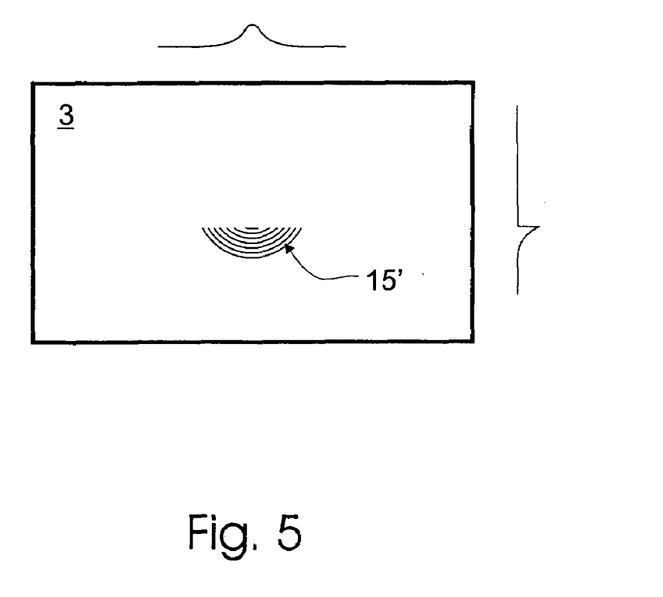
FIG. 5 is a representation of a second luminescence distribution onto the photodiode.

The method mentioned last results in the signal level of the first measurement being artificially increased shortly prior to the activation of the primary light source 5. In this case, the photo diode 3 only detects the disturbing diffusion light of the primary light source 5 but not the light of the core beam 19, (FIG. 5, FIG. 6 function d), the second measurement at the end of the pulse of the primary light source 5 leads to a result, after a subsequent forming of a difference from the first measurement, which is negative, or simply smaller than it would be if the compensation light source 25 had not been activated. This can prevent the sensor output from being activated merely based on the diffusion light 23 of the primary light source 5. For this purpose, the sensor 1 includes a deductive logic (not shown), which processes the prepared signal values of the photodiode(s) 3 of one or more measurement cycles to a control value for the sensor output. Here, it is useful to determine the average of several measurement values for the purpose of noise suppression and thus to increase sensitivity.

However, in the case, in which the photodiode 3a, 3b detects light of the core beam 19 of the primary light source 5 reflected by the object (FIG. 4, FIG. 6 function c), the second measurement at the end of the pulse of the primary light source 5 still leads to a sufficiently high value for activating the sensor output, because the luminescence of the light in the core beam 19 is usually higher by an order of magnitude than in the adjacent diffused light corona 23. The radiation intensity of the core beam 19 can be higher than the luminescence in the diffused light shell 23 by a factor, which can for example range from 50 to 50000.

Various parameters, such as luminescence, reflection angle, or duration of activation of the compensation light source 25 influence their effect in masking interferences of diffracting light.

Some of these parameters, such as e.g., the luminescence, are variable and/or can be predetermined, adjusted or controlled. This can be used for comparing or adjusting the compensation light source 25 to the various condition of use.

The luminescence of the compensation light source 25 can e.g., be sized or adjusted such that it amounts approximately to a value equal or up to five times higher than the luminescence of the diffused light integrated over the entire corona of the primary light source, or approximately equal or up to four times stronger than the maximum luminescence. Compared to the integrated luminescence of the primary light 5, the one of the additional light source 25 can be smaller, e.g., 10 to 1000 times smaller.

Due to the fact that the light of the compensation light source 25 is reflected in a similar manner as the light of the primary light source 5 in the direction of the object to be detected, the light beam of the two light sources 5, 25 impinging the detector also reduces in a similar manner at an increasing distance from the object. This way it can be achieved that the effect of the compensation light source 25 within the overall detection area does essentially not change.

The primary light source 5, the photodiode 3, and the light spot 15 on the object surface 13 define a plane. Preferably, the compensation light source 25 is also arranged in this plane, so that the effects of shiny object surfaces 13 for the two light sources 5, 25 are approximately equivalent. It is particularly advantageous for the primary light source 5 and the compensation light source 25 to be positioned in proximity.

FIG. 6 shows a diagram with the following six temporal signal progressions, which all have the same time scale:

a) Control pulse for the primary light source 5. The frequency f1 amounts e.g., to 8 kHz and the period to 0.125 ms.

b) The control pulse for the compensation light source 25: Measuring 0.25 ms the period is twice as long as the one of the primary light source 5. The compensation light source 25 is controlled such that it is switched on at a freely determinable time within the station breaks of the primary light source 5 and is immediately switched off again prior to or simultaneous to the switching-on edge of the primary light source 5. This alternating control is advantageous in that the influence of the compensation light source 25 is discernible. In this case, the signals of the compensation light source 25 can be separated from those of the primary light source 5. Instead of an integrated evaluation of the signals of the two light sources 5, 25, a band pass evaluation is also possible, as known from the publication DE 19580796. Preferably, in this case, the compensation light source 25 is activated in the middle between the station breaks of the primary light source 5.

c) Situation "Light beam 7 and light of the compensation light source 25 impinge the object surface 13 within the switching distance": Voltage signal generated by the foreground diode 3a at an integrating capacity, created by light of the primary light source 5, and the compensation light source 25. The evaluation of the signals prior to the beginning and at the end of the control pulse of the primary light source 5 (the beginning values are subtracted from the end values) produces a high positive value for each measurement cycle.

d) Situation "only light of the diffused light corona 23 and the compensation light source 25 impinges the object surface 13 within the switching distance": A voltage signal generated by the foreground diode 3a, shown enlarged by a factor 10 to 100. The compensation light source 25 is activated alternating at every other measurement cycle. In each measurement period, in which the compensation light source 25 is not switched on, the positive difference of the two measurement values exceeds a predetermined minimum value. In the other measurement periods, in which the compensation light source 25 is activated, the difference of the two measurement values is negative and thus smaller than the predetermined minimum value. The evaluation unit of the sensor 1 interprets this pattern as an interference effect by diffracting light of the light beam 7 and mask the switching of the sensor output level.

e) Situation "light beam 7 and light of the compensation light source 25 impinges the surface of the object 13 outside the switching interval (similar to c)": A voltage signal generated at an integration capacity by the background diode 3b, created by light of the primary light source 5 and the compensation light source 25. The signals of the background diode 3b are negative here due to the subtraction used: foreground diode—background diode. The evaluation of the signals prior to the beginning and at the end of the control pulse of the primary light source 5 (the original values are subtracted from the end values) produces a high negative value for each measurement cycle. The sensor output remains switched off.

f) Situation "only light of the compensation light source 25 impinges the surface 13 of the object outside the switching distance. The light beam 7 is not reflected due to a hole or an insufficiently reflecting black spot on the background":

Voltage signal generated by the background diode 3b, shown enlarged by a factor 10 to 1000. The compensation light source 25 is activated alternating only at every other measurement cycle. In each measurement period, in which the compensation light source 25 is switched on, the positive difference of the two measurement values exceeds a predetermined minimum value prior to the beginning and at the end of the control pulse of the primary light source 5. In the other measurement periods, in which the compensation light source 25 is inactive, the difference of the two measurement values is zero. The evaluation unit of the sensor 1 interprets this pattern as an interfering effect by the compensation light source 25. The sensor output remains switched off.

For the purpose of simplification, the compensation light source 25 can alternatively be activated in each measurement cycle. In the case of FIG. 6d) the interfering diffused light of the primary light source 5 is then masked in each measurement cycle. This way, the activation of the sensor output level is prevented precisely. In the case of FIG. 6f), however, in each measurement cycle a positive difference of the two measurement values would be achieved. When this positive difference exceeds a predetermined minimum value, the sensor output level would be activated. This is to be prevented in such a case by suitably weak intensities of the compensation light source 25. This is possible in common, matte, i.e. diffusing object, at certain distances in front of the sensor 1, primarily when the distance between an object to be detected in the foreground and an object to be masked in the background is rather large in reference to the distance from the object in the foreground. However, if reflecting objects with a hole or a limited size are mounted at a distance equivalent to the background such, that the core beam 19 of the primary light source 5 does not impinge on the object, however, the compensation light does so, and the objects are still aligned such that the compensation light is exactly reflected onto the receiving optic, this light is usually strong enough to mislead the sensor 1 and to cause the sensor output level to activate. This can be prevented by controlling the compensation light source 25 alternating (see FIG. 6f) or in an evaluation as shown in the following.

Figure 7:
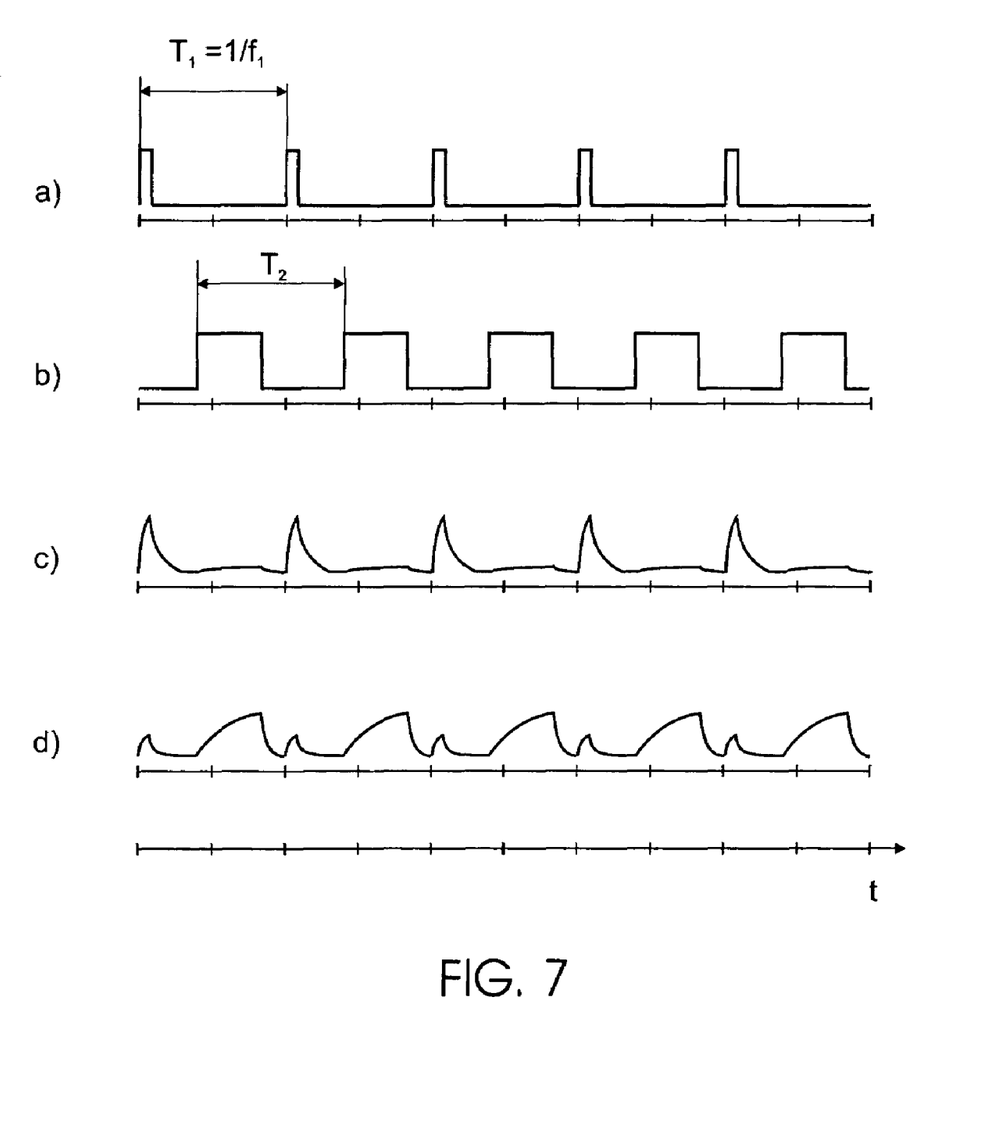
FIG. 7 is a diagram with the temporal signal progressions of another exemplary embodiment of the sensor.

FIG. 7 shows a diagram for another embodiment of the evaluation with the following temporal signal progressions, all of which have a common time scale:

a) Control pulse for the primary light source 5. The frequency $f_1$ again amounts to e.g., 8 kHz and the period $T_1 = 0.125$ ms.

b) Control pulse for the compensation light source 25: the period $T_2$ is here identical to $T_1$ of the primary light source 5. The compensation light source 25 is controlled such that at a freely determinable time within the station break of the primary light source 5 it is switched on and off again. Here, a distinctly temporal separation between the transmission pulse of the compensation light source 25 and the one of the primary light source 5 should exist. The temporally separated signals are therefore not directly interfered, but only after a compensation of the individual measurements has occurred.

c) Situation "light beam 7 and light of the compensation light source 25 impinge the object surface 13 within the switching distance": Voltage signal generated by the foreground diode 3a at an integration capacity, created by light of the primary light source 5 and the compensation light source 25. The difference of the signals prior to the beginning and at the end of the control pulses of the primary light source 5 provides a high value for the each measurement cycle. The evaluation of the signals prior to the beginning and at the end of the control pulses of the compensation light source 25 provides a very weak positive value. The subtraction of both partial signals remains high, the output of the sensors 1 is activated.

d) Situation "Only light of the diffused light corona 23 and the compensation light source 25 impinges the object surface 13 within the switching distance": Voltage signal generated by the foreground diode 3a, shown enlarged by a factor 10 to 100. The signal created by the corona of the primary light source 5 is weaker than the one of the compensation light source 25. The difference is therefore negative, the sensor output level is switched off.

If light of the primary light source 5 or the compensation light source 25 impinge the object surface 13 outside the switching distance, one light as well as the other is imaged each on the background diode 3b. In this embodiment, both signals are therefore negative. Here, it is useful only to evaluate the negative signal created by the primary light source, instead of the difference of the two signals. A signal created by the compensation light source 5 on the background diode 3b is irrelevant. Regardless if present or not, the output level of the sensor 1 should be switched off, when the light of the primary light source 5 primarily impinges the background diode 3b.

This way, in this embodiment the following situations can be distinguished: The beam of the primary light source 5 primarily impinges the foreground diode 3a or the background diode 3b (different algebraic sign of the signal), compensation light impinges the foreground diode 3a or the background diode 3b (also differing in their algebraic sign of the signal). The output level of the sensor 1 remains switched off, except when the signal of the primary light source 5 on the foreground diode 3a is stronger than the signal of the compensation light source 25 on the foreground diode 3a. If necessary, one signal can be scaled prior to the comparison, here.

Using the sensor and the method according to the invention, in particular, stacked, shiny or reflecting objects, such as wafers or CDs with a high resolution and a reproducibility of 0.1 mm or less can be detected.

List of Reference Characters
1 Sensor
3 Photodiodes
3a Foreground diode
3b Background diode
5 Primary light source
7 Light beam
9 Blind
11 Lens
13 Object surface
15 Light spot on the object surface
15' Imaged light spot on the detector
17 Imaging optic
19 Core beam
20 Core beam—light spot on the object surface
20' Image of the core beam—light spot on the detector
21 Edge
22 Electronic switch
23 Diffused light shell
24 Coupled condenser
25 Compensation light source
26 High-pass filter
27 Light cone
28 Sampel & Hold
30 AD-converting member
32 Difference member
34 Processing unit

The invention claimed is:

1. An optical sensor (1) for detecting objects within a detection range, comprising a light beam (7), created by a primary light source (5), and a detector, the light beam (7) having a diffused light corona (23) encircling a core beam (19) that is detected by the detector for detecting the objects, the sensor (1) includes a compensation light source (25) that covers the diffused light corona of the primary light source and is also detected by the detector and processed in conjunction with the light beam (7) that is detected for masking interferences caused by the diffused light corona (23).

2. An optical sensor (1) according to claim 1, wherein the compensation light source (25) is arranged in a plane defined by the light beam (7) and the detector.

3. An optical sensor (1) according to claim 1, wherein the compensation light source (25) is arranged adjacent to the primary light source (5).

4. An optical sensor (1) according to claim 1, wherein a light cone (27) created by the compensation light source (25) is positioned coaxially around the core beam (19) created by the primary light source (5).

5. An optical sensor (1) according to claim 1, wherein a reflection angle of the compensation light source (25) is smaller than 20°.

6. An optical sensor (1) according to claim 1, wherein the compensation light source (25) and/or optical elements allocated to the compensation light source (25) are arranged such that the light beam (7) created by the primary light source (5) is located at least partially within a detection range and entirely inside of the light beam created by the compensation light source (25).

7. An optical sensor (1) according to claim 1, wherein the compensation light source (25) and/or optical elements allocated to the compensation light source (25) are arranged such that the light beam (7) created by the primary light source (5) is located entirely inside of the light beam created by the compensation light source (25).

8. An optical sensor according to claim 1, wherein the detector includes at least one photosensitive element and the detector is embodied to distinguish at least two different impingement positions of the light reflected from the object being measured.

9. A method for suppressing faults caused by diffused light in an optical sensor (1), comprising:
operating a primary light source (5) and a compensation light source (25) in a pulsing manner, and switching-on phases of the compensation light source (25) during switching-off phases of the primary light source (5), and
masking interferences caused by a diffused light corona (23) of the primary light source using receiving signals generated by the compensation light source which covers an area illuminated by the diffused light corona of the primary light source.

10. A method according to claim 9, wherein switching-off edges of the compensation light source (25) occur simultaneously or immediately prior to switching-on edges of the primary light source (5).

11. A method according to claim 9, wherein the switching-on phases of the compensation light source (25) are arranged entirely inside the switching-off phases of the primary light source (5).

12. A method according to claim 9, wherein the switching-on phases of the compensation light source (25) are arranged immediately prior to edges of the switching-on phases of the primary light source (5).

13. A method according to claim 9, wherein the receiving signals created by the compensation light source (25) are subtracted from receiving signals of the primary light source (5).

14. A method according to claim 13, further comprising subtracting the receiving signals created by the compensation light source (25) from the receiving signals of the primary light source (5) using a detector due to opposite phases of the primary light source and receiving light source.

15. A method according to claim 13, further comprising carrying out the subtraction of the receiving signals created by the compensation light source (25) by analog or digital signal processing.

16. A method according to claim 9, further comprising activating the compensation light source (25) in only some station breaks in operation of the primary light source (5).

17. A method according to claim 16, wherein the activation of the compensation light source (25) occurs alternating in every other one of the station breaks in operation of the primary light source (5).

18. A method according to claim 9, further comprising sizing or adjusting the luminescence of the compensation light source (25) in order to compensate for the interferences of the diffused light corona (23).

19. A method according to claim 9, further comprising scaling the receiving signals generated by the compensation light source (25) in order to compensate for the interferences of the diffused light corona (23).

20. A method according to claim 9, wherein the light beam (7) created by the primary light source (5) is located entirely inside of the light beam created by the compensation light source (25).

21. A method of using an optical sensor for laterally detecting stacked objects, comprising:
   providing a light beam (7), created by a primary light source (5), and a detector, the light beam (7) having a diffused light corona (23 encircling a core beam (19), the sensor (1) includes a compensation light source (25) for masking interferences caused by the diffused light corona (23) by covering an area illuminated by the diffused light corona of the primary light source,
   operating the primary light source (5) and the compensation light source (25) in a pulsing manner, and switching-on phases of the compensation light source (25) during switching-off phases of the primary light source (5), and
   masking interferences caused by the diffused light corona (23) of the primary light source using receiving signals generated by the compensation light source to laterally detect stacked objects.

22. A method according to claim 21, wherein the light beam (7) created by the primary light source (5) defines a beam space that is located entirely inside of the light beam created by the compensation light source (25).

* * * * *